US012630131B2

(12) United States Patent
Nobori

(10) Patent No.: US 12,630,131 B2
(45) Date of Patent: May 19, 2026

(54) HYDRAULIC PRESSURE CONTROL UNIT

(71) Applicant: Robert Bosch GmbH, Stuttgart (DE)

(72) Inventor: Masatoshi Nobori, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 18/002,903

(22) PCT Filed: Jun. 11, 2021

(86) PCT No.: PCT/IB2021/055151
§ 371 (c)(1),
(2) Date: Dec. 22, 2022

(87) PCT Pub. No.: WO2021/260478
PCT Pub. Date: Dec. 30, 2021

(65) Prior Publication Data
US 2023/0256946 A1 Aug. 17, 2023

(30) Foreign Application Priority Data

Jun. 26, 2020 (JP) ................................. 2020-110440

(51) Int. Cl.
*B60T 8/40* (2006.01)
*F15B 13/02* (2006.01)

(52) U.S. Cl.
CPC .......... *B60T 8/4068* (2013.01); *F15B 13/027* (2013.01); *F15B 2201/411* (2013.01); *F15B 2211/405* (2013.01)

(58) Field of Classification Search
CPC B60T 8/4068; F15B 13/027; F15B 2201/411; F15B 2211/405
See application file for complete search history.

(56) References Cited

U.S. PATENT DOCUMENTS

2013/0287609 A1 10/2013 Fellmeth et al.
2016/0176387 A1* 6/2016 Speer .................. F16K 27/0209
303/10

(Continued)

FOREIGN PATENT DOCUMENTS

CN 104709254 A 6/2015
CN 106232440 A 12/2016

(Continued)

OTHER PUBLICATIONS

International Search Report and Written for Application No. PCT/IB2021/055151 dated Oct. 15, 2021 (8 pages).

*Primary Examiner* — Vishal R Sahni
(74) *Attorney, Agent, or Firm* — Michael Best & Friedrich LLP

(57) ABSTRACT

A hydraulic pressure control unit according to the present invention is a hydraulic pressure control unit for a vehicular brake system and includes: a discharge channel (140), from which a brake fluid is discharged, a pressure of the brake fluid being increased by a pump (60); and a pulsation reducer (100) provided to an intermediate portion of the discharge channel (140). The pulsation reducer includes: a pressure change suppressor (110), a volume of which varies according to the pressure of the inflow brake fluid; and a throttle valve (120) arranged on a downstream side of the pressure change suppressor (110) in the discharge channel (140). The throttle valve (120) includes: a first housing (121) having an end surface (121*a*), one end of which is opened and the other end of which is provided with a first through-hole (121*b*), the brake fluid flowing into the first through-hole (121*b*); a first valve body (122) movable in an axial direction of the first housing (121) in the first housing (121); and a first spring member (124) urging the first valve body (122) in a direction toward the first through-hole (121*b*) of the first housing (121). The first valve body (122) includes (Continued)

a seal section (122*b*) that closes the first through-hole (121*b*) of the first housing (121) and is formed with a throttle hole (122*ba*).

13 Claims, 6 Drawing Sheets

(56)                    References Cited

U.S. PATENT DOCUMENTS

| | | | | |
|---|---|---|---|---|
| 2019/0248353 | A1 * | 8/2019 | Kratzer | B60T 8/48 |
| 2023/0256946 | A1 * | 8/2023 | Nobori | B60T 8/4068 |
| | | | | 303/87 |

FOREIGN PATENT DOCUMENTS

| | | | | | |
|---|---|---|---|---|---|
| DE | 102012207334 | A1 * | 11/2013 | | B60T 8/4068 |
| DE | 102013200370 | A1 * | 7/2014 | | B60T 8/4031 |
| DE | 102014225953 | A1 * | 6/2016 | | B60T 8/4872 |
| DE | 102016206032 | A1 * | 10/2017 | | B60T 15/02 |
| JP | 2017537020 | A | 12/2017 | | |
| KR | 20080091626 | A * | 10/2008 | | B60T 8/4018 |
| WO | WO-2015188967 | A1 * | 12/2015 | | B60T 8/4068 |
| WO | WO-2018068929 | A1 * | 4/2018 | | F16K 31/10 |
| WO | 2019138281 | A1 | 7/2019 | | |

* cited by examiner

[FIG. 1]
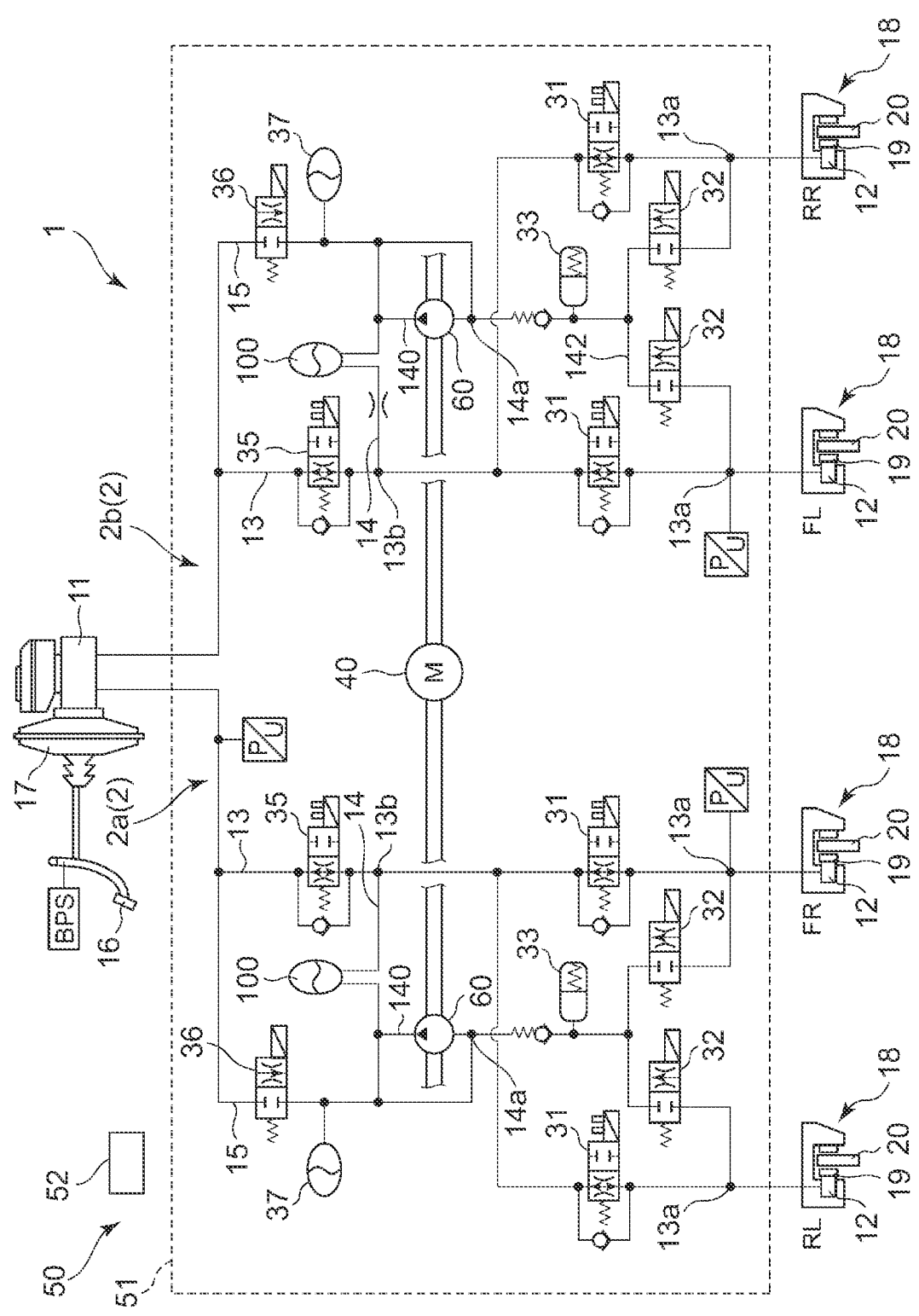

[FIG. 2]
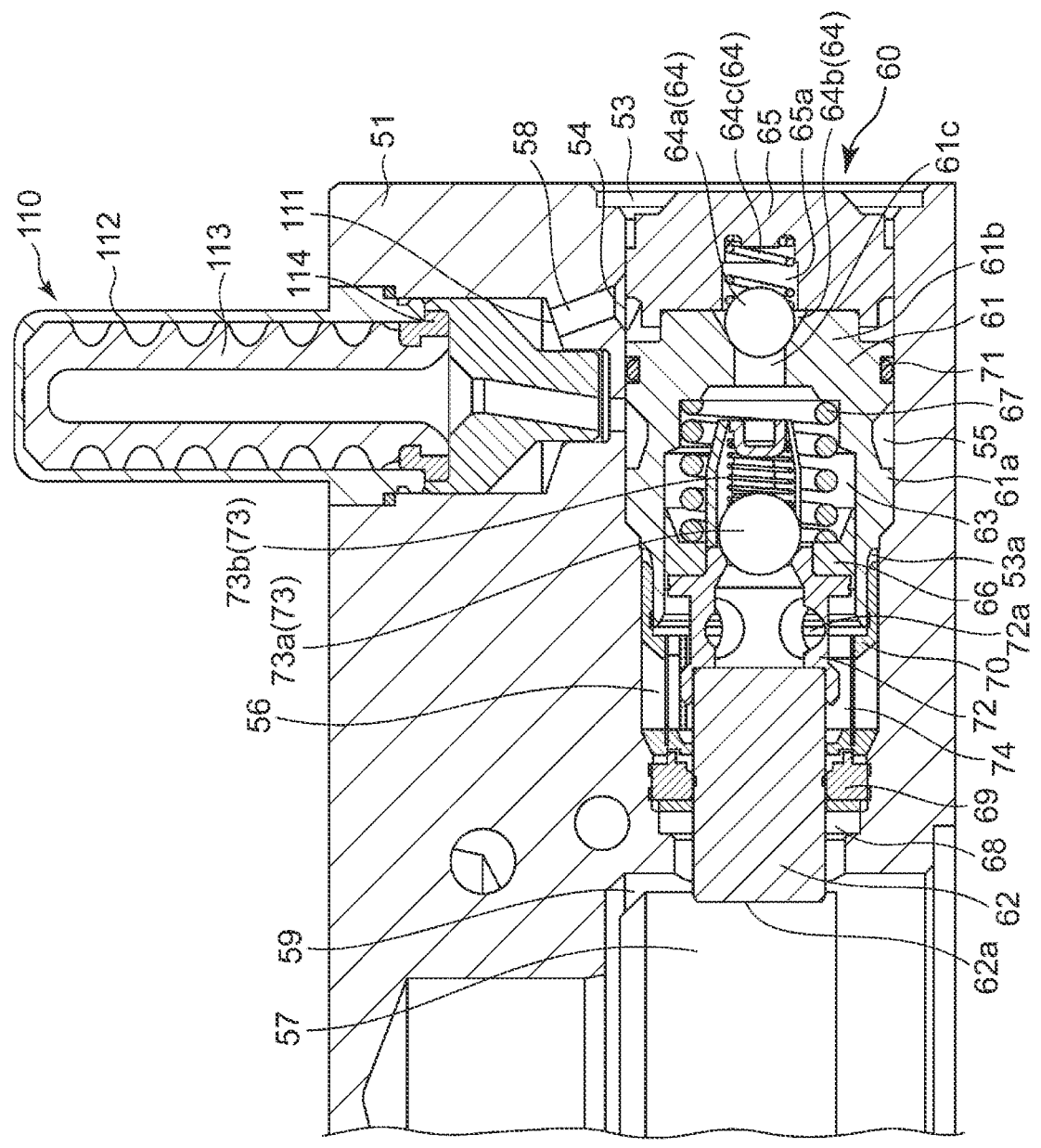

[FIG. 3]
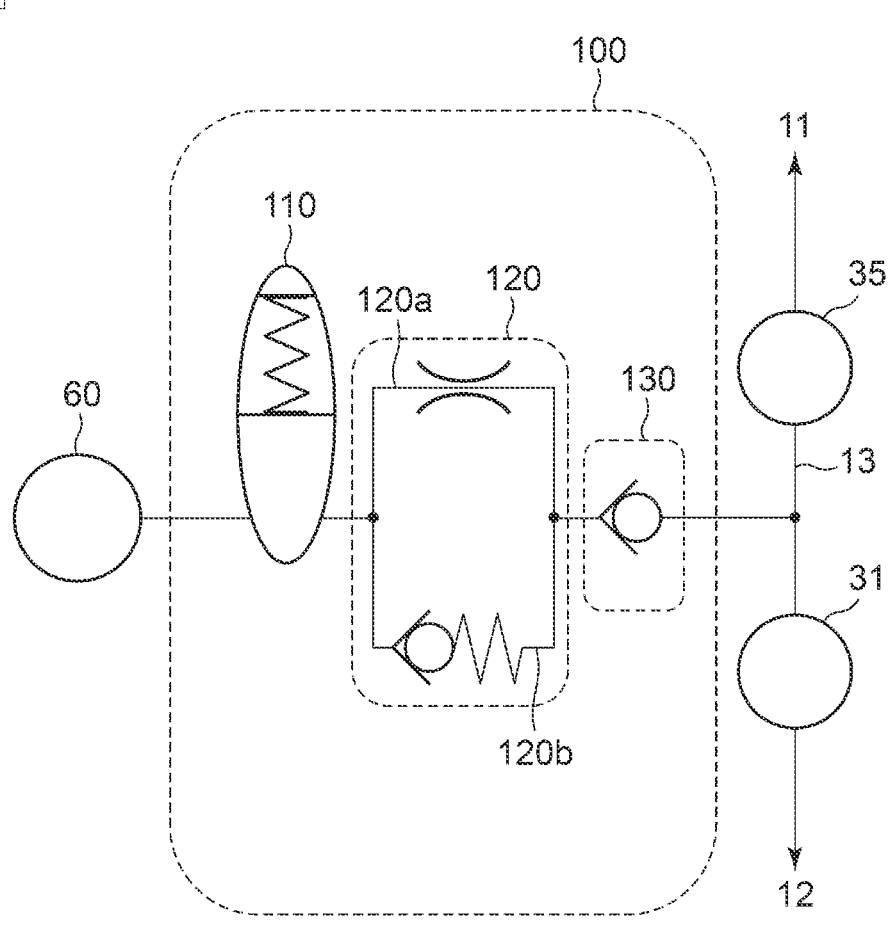

[FIG. 4]
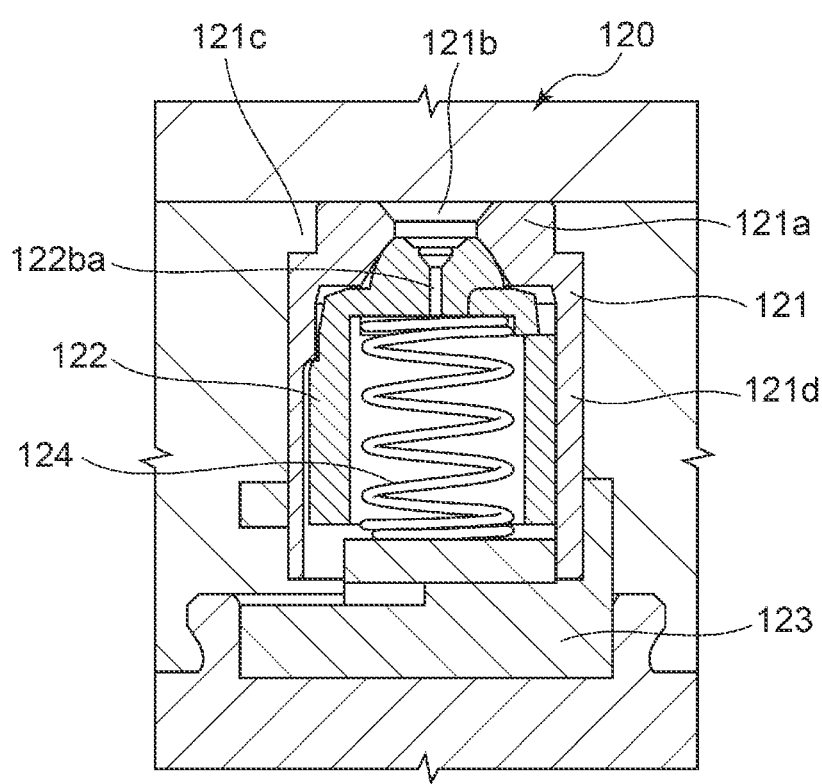

[FIG. 5]
(a)
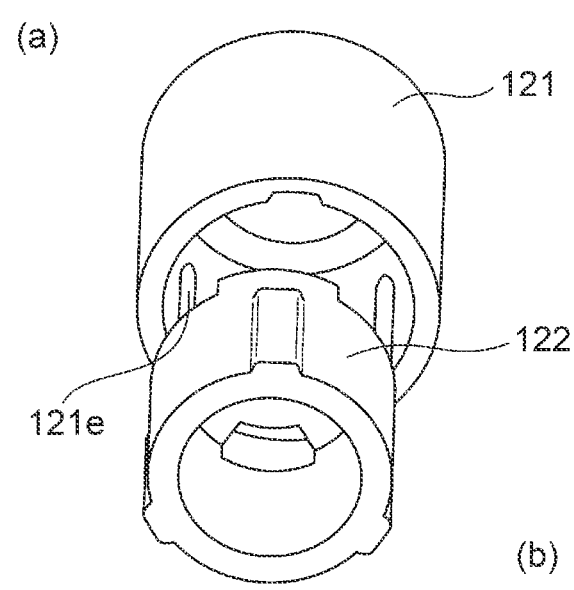
121
121e
122
(b)
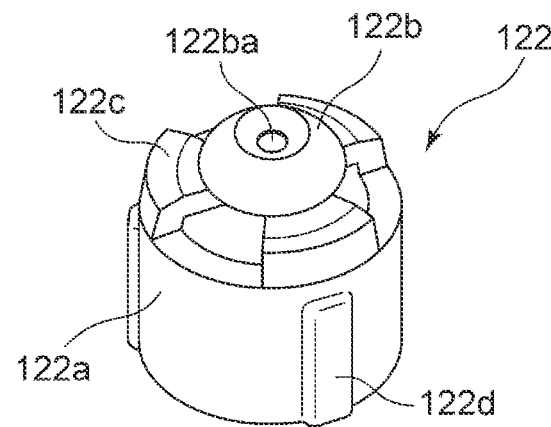
122ba 122b 122
122c
122a
122d
(c)
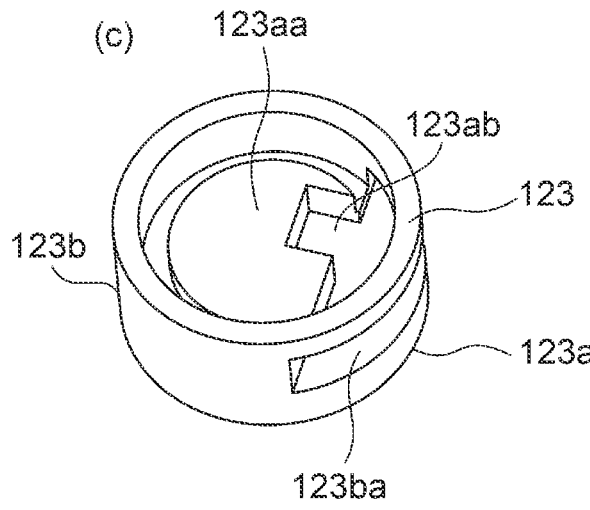
123aa
123ab
123
123b
123a
123ba

[FIG. 6]
(a)
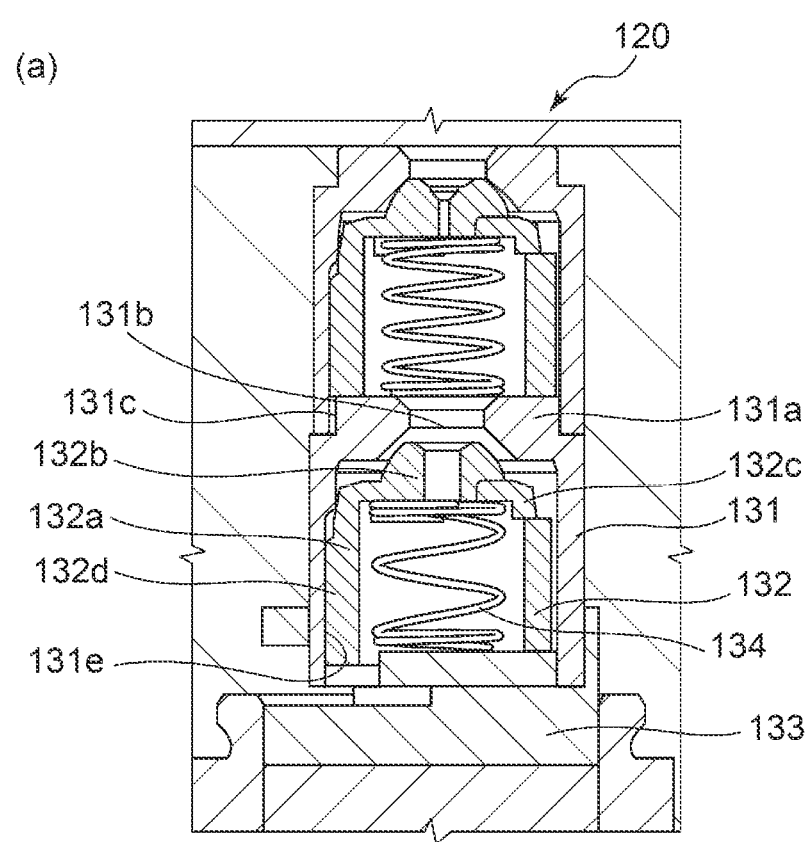
(b)
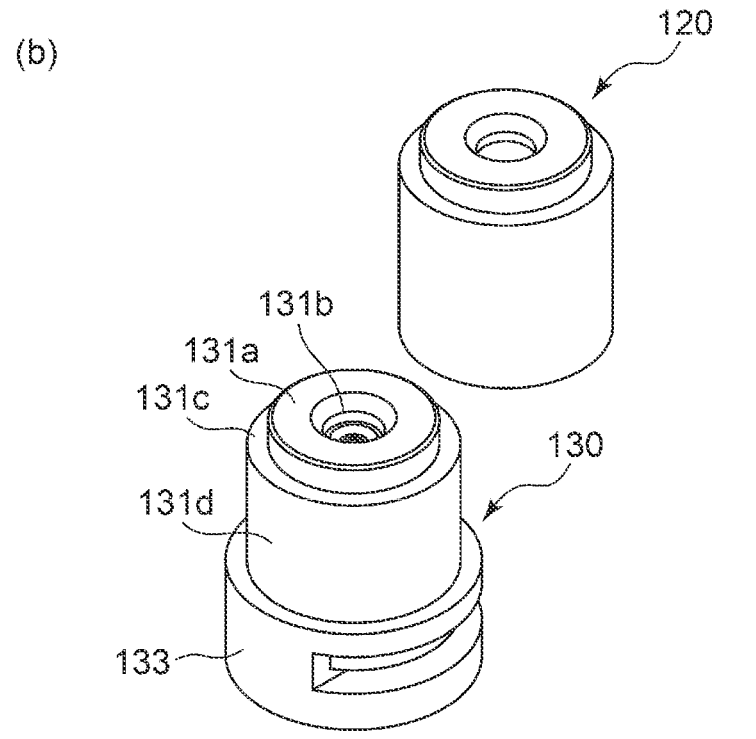

HYDRAULIC PRESSURE CONTROL UNIT

BACKGROUND OF THE INVENTION

The present invention relates to a brake hydraulic pressure control unit, in particular, a hydraulic pressure control unit that includes a pump for increasing a hydraulic pressure of a brake fluid.

Conventionally, such a brake hydraulic pressure control unit for a vehicle of this type has been known that has a base body, to which an electromagnetic valve for controlling a flow of a brake fluid and the like are attached, and in which a pump is attached to the base body, the pump causing the brake fluid released from a wheel cylinder to recirculate and return to a master cylinder, suctioning the brake fluid from the master cylinder, and pressure-feeding the brake fluid, a pressure of which is increased, to the wheel cylinder.

In addition, in order to reduce pulsations of the brake fluid that is pressure-fed by the pump, a brake hydraulic pressure control unit provided with a damper on a discharge side of the pump is available. In JP-A-2017-537020, a structure of the damper having a dome-shaped suppressor housing, in which a tube-shaped elastically-deformable suppressing element is provided, is disclosed. According to this damper, an inner surface or an outer surface of the suppressing element is subjected to action of the brake fluid, and the damper can suppress a pressure change in the brake fluid when the pressure change occurs to the brake fluid. A throttle is installed on a downstream side of the damper in order to temporarily store the brake fluid, which is discharged from the pump, in this suppressing element.

SUMMARY OF THE INVENTION

In order to enhance a pulsation reduction effect of the damper, it is desired to secure a volume of the suppressing element as large as possible. In addition, when the hydraulic pressure of the brake fluid on the master cylinder is increased, the brake fluid possibly flows back to the damper. In order to inhibit such reflux, it is desired to provide a check valve on the downstream side of the damper. Meanwhile, it has been requested to simplify structures of a throttle valve and the check valve as much as possible while securing the volume of the suppressing element.

The present invention has been made with the above-described problem as the background and therefore has a purpose of improving structures of a throttle valve and a check valve that are provided to a downstream side of a damper.

A hydraulic pressure control unit according to the present invention is a hydraulic pressure control unit for a vehicular brake system and includes: a discharge channel from which a brake fluid is discharged, a pressure of the brake fluid being increased by a pump; and a pulsation reducer that is provided to an intermediate portion of the discharge channel. The pulsation reducer includes: a pressure change suppressor, a volume of which varies according to the pressure of the inflow brake fluid; and a throttle valve that is arranged on a downstream side of the pressure change suppressor in the discharge channel. The throttle valve includes: a first housing that has an end surface, one end of which is opened and the other end of which is provided with a first through-hole, the brake fluid flowing into the first through-hole; a first valve body that can move in an axial direction of the first housing in the first housing; and a first spring member that urges the first valve body in a direction toward the first through-hole of the first housing. The first valve body includes a seal section that closes the first through-hole of the first housing and is formed with a throttle hole.

According to the present invention, it is possible to provide the throttle valve capable of handling a fluctuation in the pressure of the brake fluid that is discharged by the pump and guaranteeing stable operation. In addition, it is possible to simplify an assembly process and cut cost by sharing components among the throttle valve and the check valve.

BRIEF DESCRIPTION OF THE DRAWINGS

FIG. 1 is a view illustrating an example of a system configuration of a brake system according to an embodiment of the present invention.

FIG. 2 is a partial cross-sectional view illustrating an example of a mounted state of a pump and a pressure change suppressor to a housing in a hydraulic pressure control unit of the brake system according to the embodiment of the present invention.

FIG. 3 is a conceptual view of a pulsation reducer in the hydraulic pressure control unit of the brake system according to the embodiment of the present invention.

FIG. 4 is a cross-sectional view according to an embodiment of a throttle valve in the hydraulic pressure control unit of the brake system according to the embodiment of the present invention.

FIG. 5 includes exploded views (a), (b) and (c) according to the embodiment of the throttle valve in the hydraulic pressure control unit of the brake system according to the embodiment of the present invention.

FIG. 6 includes a cross-sectional view (a) according to an embodiment of the throttle valve and a check valve in the hydraulic pressure control unit of the brake system according to the embodiment of the present invention. FIG. 6 also includes a perspective view (b) of the throttle valve and the check valve.

DETAILED DESCRIPTION

A description will hereinafter be made on a hydraulic pressure control unit according to the present invention with reference to the drawings.

Hereinafter, a description will be made on a case where a brake system including the hydraulic pressure control unit according to the present invention is mounted to a four-wheeled vehicle. However, the brake system including the hydraulic pressure control unit according to the present invention may be mounted to a vehicle (a two-wheeled vehicle, a truck, a bus, or the like) other than the four-wheeled vehicle. A configuration, operation, and the like, which will be described below, constitute merely one example, and the brake system including the hydraulic pressure control unit according to the present invention is not limited to a case with such a configuration, such operation, and the like. In the drawings, the same or similar members or portions will be denoted by the same reference sign or will not be denoted by a reference sign. In addition, a detailed structure will appropriately be illustrated in a simplified manner or will not be illustrated.

<Configuration and Operation of Brake System 1>

A description will be made on a configuration and operation of a brake system 1 according to this embodiment.

FIG. 1 is a view illustrating an example of a system configuration of the brake system according to the embodiment of the present invention.

As illustrated in FIG. 1, the brake system 1 is mounted to a vehicle 1000 and includes a hydraulic circuit 2. The hydraulic circuit 2 has: a primary channel 13 that communicates between a master cylinder 11 and a wheel cylinder 12; a secondary channel 14 through which a brake fluid in the primary channel 13 is released; and a supply channel 15 through which the brake fluid is supplied to the secondary channel 14. The hydraulic circuit 2 is filled with the brake fluid. The brake system 1 according to this embodiment includes, as the hydraulic circuit 2, two hydraulic circuits 2a, 2b. The hydraulic circuit 2a is a hydraulic circuit that communicates between the master cylinder 11 and the wheel cylinder 12 in each of wheels RL, FR through the primary channel 13. The hydraulic circuit 2b is a hydraulic circuit that communicates between the master cylinder 11 and the wheel cylinder 12 in each of wheels FL, RR through the primary channel 13. These hydraulic circuits 2a, 2b have the same configuration except that the communicated wheel cylinders 12 differ.

A piston (not illustrated) is installed in the master cylinder 11, and the piston reciprocates in an interlocking manner with a brake pedal 16 that is an example of an input section in the brake system 1. A booster 17 is interposed between the brake pedal 16 and the piston in the master cylinder 11, and a depression force by a user is boosted and transmitted to the piston. The booster 17 may be a negative pressure booster that uses a negative pressure of an engine or may be an electric brake booster that causes the piston in the master cylinder 11 to stroke by drive power of a motor and thereby controls a hydraulic pressure. The wheel cylinder 12 is provided to a brake caliper 18. When a hydraulic pressure of the brake fluid in the wheel cylinder 12 is increased, a brake pad 19 of the brake caliper 18 is pressed against a rotor 20, and the wheel thereby brakes.

An upstream end of the secondary channel 14 is connected to an intermediate portion 13a of the primary channel 13, and a downstream end of the secondary channel 14 is connected to an intermediate portion 13b of the primary channel 13. An upstream end of the supply channel 15 communicates with the master cylinder 11, and a downstream end of the supply channel 15 is connected to an intermediate portion 14a of the secondary channel 14.

Note that the upstream side in the secondary channel 14 means an upstream side in a flow of the brake fluid at the time when a pump is driven and the brake fluid circulates from the wheel cylinder to the master cylinder, and a downstream side therein means a downstream side in the flow of the brake fluid.

An inlet valve (EV) 31 is provided to a region between the intermediate portion 13b and the intermediate portion 13a in the primary channel 13 (a region on the wheel cylinder 12 side with the intermediate portion 13b being a reference). An outlet valve (AV) 32 is provided in a region between the upstream end and the intermediate portion 14a in the secondary channel 14. An accumulator 33 is provided in a region between the outlet valve 32 and the intermediate portion 14a in the secondary channel 14. The inlet valve 31 is an electromagnetic valve that is opened in an unenergized state and closed in an energized state, for example. The outlet valve 32 is an electromagnetic valve that is closed in an unenergized state and opened in an energized state, for example.

A pump 60 is provided in a region between the intermediate portion 14a and the downstream end in the secondary channel 14. A Suction side of the pump 60 communicates with the intermediate portion 14a. A discharge side of the pump 60 communicates with the downstream end of the secondary channel 14. In detail, the brake system 1 includes a suction channel 142 and a discharge channel 140 as parts of the secondary channel 14 as components of a hydraulic pressure control unit 50. The suction channel 142 constitutes a channel between the upstream end of the secondary channel 14 and the suction side of the pump 60, and the discharge channel 140 constitutes a channel between the discharge side of the pump 60 and the downstream end of the secondary channel 14.

Here, the hydraulic pressure control unit 50 includes a pulsation reducer 100 in the discharge channel, and the pulsation reducer 100 dampens pulsation of the brake fluid discharged from the pump 60. The pulsation reducer 100 includes: a pressure change suppressor 110 in which a pressure suppression element 111 is installed and is elastically deformed according to the pressure of the brake fluid flowing therein; a throttle valve 120 that changes a flow rate of the brake fluid according to the pressure of the brake fluid that flows out of the pressure change suppressor 110; and a check valve 130 that inhibits a reverse flow of the brake fluid into the pressure change suppressor 110. Here, according to a type of the vehicle and a magnitude of a braking force that is requested to the vehicle, the check valve 130 may not be provided.

A first switching valve (USV) 35 is provided to a region on the master cylinder 11 side with the intermediate portion 13b being a reference in the primary channel 13. The supply channel 15 is provided with a second switching valve (HSV) 36 and a damper unit 37. The damper unit 37 is provided in a region between the second switching valve 36 and the downstream end in the supply channel 15. The first switching valve 35 is an electromagnetic valve that is opened in an unenergized state and closed in an energized state, for example. The second switching valve 36 is an electromagnetic valve that is closed in an unenergized state and opened in an energized state, for example. Note that the brake system 1 can be operated if the damper unit 37 is omitted because of an attachment space and a requested pulsation damping characteristic. The brake system 1 can be operated even when the damper unit 37 may not be provided according to an attachment space or a requested pulsation damping characteristic.

The hydraulic pressure control unit 50 at least includes: a housing 51; members provided to the housing 51; and a controller (ECU) 52. In the hydraulic pressure control unit 50, when the controller 52 controls operation of the inlet valve 31, the outlet valve 32, the pumps 60, the first switching valve 35, and the second switching valve 36, the hydraulic pressure of the brake fluid in the wheel cylinder 12 is controlled. That is, the controller 52 governs the operation of the inlet valves 31, the outlet valves 32, the pumps 60, the first switching valves 35, and the second switching valves 36.

The controller 52 may be provided as one unit or may be divided into plural units. In addition, the controller 52 may be attached to the housing 51 or may be attached to another member. Furthermore, the controller 52 may partially or entirely be constructed of a microcomputer, a microprocessor unit, or the like, may be constructed of a member in which firmware and the like can be updated, or may be a program module or the like that is executed by a command from a CPU or the like, for example.

The controller 52 executes the following hydraulic pressure control operation, for example.

In the case where shortage or possible shortage of the hydraulic pressure in the hydraulic circuit 2 is detected from a detection signal of a position sensor (BPS) for the brake pedal 16 and a detection signal of a hydraulic pressure sensor for the hydraulic circuit 2 when the brake pedal 16 of the vehicle 1000 is operated in a state where the inlet valve 31 is opened, the outlet valve 32 is closed, the first switching valve 35 is opened, and the second switching valve 36 is closed, the controller 52 initiates active pressure build-up control operation.

In the active pressure build-up control operation, the controller 52 maintains the inlet valve 31 in an open state and thereby allows a flow of the brake fluid from the intermediate portion 13*b* of the primary channel 13 to the wheel cylinder 12. In addition, the controller 52 maintains the outlet valve 32 in a closed state and thereby restricts a flow of the brake fluid from the wheel cylinder 12 to the accumulator 33. Furthermore, the controller 52 closes the first switching valve 35 and thereby restricts the flow of the brake fluid in the channel from the master cylinder 11 to the intermediate portion 13*b* of the primary channel 13 without interposing the pump 60. Moreover, the controller 52 opens the second switching valve 36 and thereby allows a flow of the brake fluid in the channel from the master cylinder 11 to the intermediate portion 13*b* of the primary channel 13 via the pump 60. Then, the controller 52 drives the pump 60 so as to increase (build up) the hydraulic pressure of the brake fluid in the wheel cylinder 12.

When it is detected that the shortage of the hydraulic pressure in the hydraulic circuit 2 is resolved or avoided, the controller 52 opens the first switching valve 35, closes the second switching valve 36, and stops driving the pump 60, so as to terminate the active pressure build-up control operation.

At this time, there is a case where, when the pump 60 is driven, the pulsation, which is generated in the brake fluid, is transmitted to the wheel cylinder 12 through the secondary channel 14 and the primary channel 13. There is also a case where such pulsation is then transmitted to an engine room, which accommodates the hydraulic pressure control unit 50 for the brake system 1, and generates noise. There is a case where this noise becomes so loud that the user (a driver) receives a sense of discomfort. Thus, it is important to reduce the pulsation that is generated during driving of the pump 60.

In view of the above, in the brake system 1 according to this embodiment, that is, in the hydraulic pressure control unit 50, the brake fluid that is discharged from the pump 60 flows into the pressure change suppressor 110. Then, the pulsation of the brake fluid, which has flowed into the pressure change suppressor 110, is dampened by the pressure suppression element 111 and is thereafter transmitted to the wheel cylinder through the throttle valve 120 and the check valve 130.

Accordingly, the brake system 1 according to this embodiment, that is, the hydraulic pressure control unit 50 can reduce the pulsation that is generated during driving of the pump 60.

<Mounted Configuration of Pump 60 and Pressure Change Suppressor 110 to Housing 51>

A description will be made on an example of a configuration at a time when the pump 60 and the pressure change suppressor 110 are mounted to the housing 51 in the hydraulic pressure control unit 50 for the brake system 1 according to this embodiment.

FIG. 2 is a partial cross-sectional view illustrating an example of a mounted state of the pump 60 and the pressure change suppressor 110 to the housing 51 in the hydraulic pressure control unit 50 of the brake system 1 according to the embodiment of the present invention. Here, FIG. 2 illustrates the example in which the single pump 60 is provided to the single hydraulic circuit.

As illustrated in FIG. 2, the housing 51 is formed with an accommodation chamber 59 in which a driveshaft for driving a piston 62 of the pump 60 is provided. The accommodation chamber 59 is a bottomed hole that is formed on an outer wall of the housing 51. The housing 51 is also formed with accommodation chambers 53, each of which accommodates the pump 60. Each of these accommodation chambers 53 is a stepped through-hole that penetrates the housing 51 from the outer wall thereof to the accommodation chamber 59.

The pump 60, which is accommodated in the accommodation chamber 53, includes a cylinder 61, the piston 62, and the like. The cylinder 61 is formed in a bottomed cylindrical shape that has a bottom section 61*b*. The cylinder 61 accommodates a joint 72, one end of which is connected to the piston 62, and an annular sealing member 66 that is connected to the other end of the joint 72. A space that is surrounded by an inner circumferential surface of the cylinder 61 and the annular sealing member 66 serves as a pump chamber 63. These piston 62, joint 72, and annular sealing member 66 can freely reciprocate in an axial direction of the cylinder 61. At this time, the annular sealing member 66 prevents leakage of the brake fluid from the pump chamber 63 to an inflow chamber 74. An end 62*a* on the other end side of the piston 62 is projected into the accommodation chamber 59.

In the cylinder 61, a spring 67 is accommodated between the bottom section 61*b* and the piston 62, that is, in the pump chamber 63. This spring 67 urges the annular sealing member 66 to the inflow chamber side. Thus, the piston 62 is always urged to the accommodation chamber 59 side. In this way, the end 62*a* of the piston 62 abuts an eccentric section 57 that is formed in the driveshaft in the accommodation chamber 59. A center position of the eccentric section 57 is eccentric with respect to a rotation center of the driveshaft. Thus, when the driveshaft is rotated by a motor 40, the eccentric section 57 is eccentrically rotated with respect to the rotation center of the driveshaft. That is, due to the eccentric rotary motion of the eccentric section 57, the piston 62, the end 62*a* of which abuts the eccentric section 57, reciprocates in the axial direction of the cylinder 61.

The piston 62 is slidably guided by a guide member 68 that is provided to an inner circumferential surface of the accommodation chamber 53. In the accommodation chamber 53, an annular sealing member 69 is attached adjacent to the guide member 68. This sealing member 69 prevents, in a liquid-tight manner, outflow of the brake fluid from an outer circumferential surface of the piston 62.

A suction port 72*a* is formed on an outer circumferential surface of the joint 72. In addition, at an end of the joint 72, a suction valve 73 is provided to close an opening to the pump chamber 63 in a freely openable/closable manner. This suction valve 73 includes: a ball valve 73*a* that closes the opening of the joint 72; and a spring 73*b* that urges the ball valve 73*a* from the cylinder 61 side. In addition, a cylindrical filter 70 is attached to cover the suction port 72*a* of the joint 72.

In the bottom section 61*b* of the cylinder 61, a through-hole 61*c* is formed to communicate between the pump chamber 63 and the outside of the cylinder 61. A discharge valve 64 is provided on an opening side that is an opposite side of the pump chamber 63 in this through-hole 61*c*. The discharge valve 64 includes: a ball valve 64*a*; a valve seat 64*b* that is formed to a circumferential edge of an opening end of the through-hole 61*c* and allows the ball valve 64*a* to be seated thereon; and a spring 64c that urges the ball valve 64a in a direction to be seated on the valve seat 64b. This discharge valve 64 is arranged between the cylinder 61 and a cover 65.

In detail, the cover 65 is press-fitted to the bottom section 61b of the cylinder 61, for example. This cover 65 is formed with a bottomed hole 65a that has an opening at a position opposing the through-hole 61c of the bottom section 61b. The spring 64c of the discharge valve 64 is accommodated in the bottomed hole 65a. An inner diameter of the bottomed hole 65a is larger than an outer diameter of the ball valve 64a. Thus, when the ball valve 64a separates from the valve seat 64b, the ball valve 64a moves into the bottomed hole 65a. More specifically, when the hydraulic pressure of the brake fluid in the pump chamber 63 of the cylinder 61 is increased and a force of the brake fluid that presses the ball valve 64a becomes larger than an urging force of the spring 64c, the ball valve 64a separates from the valve seat 64b, and the pump chamber 63 communicates with the bottomed hole 65a of the cover 65 via the through-hole 61c. Then, the brake fluid in the pump chamber 63 flows into the bottomed hole 65a. In the cover 65, a groove that communicates between the outside of the cover 65 and the bottomed hole 65a is formed as a discharge port (not illustrated). The brake fluid that has flowed into the bottomed hole 65a of the cover 65 is discharged from the discharge port to the outside of the cover 65, that is, the outside of the pump 60.

As described above, the thus-configured pump 60 is accommodated in the accommodation chamber 53 that is formed in the housing 51. More specifically, a portion around an opening of the accommodation chamber 53 is caulked in a state where an annular projection 61a that is formed to an outer circumferential portion of the cylinder 61 abuts a step section 53a of the accommodation chamber 53. In this way, the pump 60 is fixed in the accommodation chamber 53 of the housing 51.

When the pump 60 is accommodated in the accommodation chamber 53 just as described, a discharge chamber 54 is formed between an outer circumferential surface of the pump 60 and the inner circumferential surface of the accommodation chamber 53, and the discharge chamber 54 is a space that communicates with the discharge port of the pump 60. That is, the discharge chamber 54 is a space that is formed annularly on the outer circumferential side of the pump 60 in a manner to communicate with the discharge port of the pump 60. As will be described below, the discharge chamber 54 constitutes a part of the discharge channel 140.

In the pump 60, a space between the annular projection 61a of the cylinder 61 and the cover 65 is partitioned into two spaces by a partitioning section 71. The space on the cover 65 side from the partitioning section 71 serves as the discharge chamber 54. Meanwhile, the space on the projection 61a side from the partitioning section 71 serves as an annular channel 55.

In this embodiment, when the pump 60 is accommodated in the accommodation chamber 53, an annular channel 56 that is a space communicating with the suction port 72a of the pump 60 is formed between the outer circumferential surface of the pump 60 and the inner circumferential surface of the accommodation chamber 53. That is, the annular channel 56 is a space that is formed annularly on an outer circumferential side of the pump 60 in the manner to communicate with the suction port 72a of the pump 60. The annular channel 56 is formed between the annular projection 61a of the cylinder 61 and the sealing member 69. In other words, the annular channel 56 is formed on an outer circumferential side of the filter 70, which is provided to cover an opening of the suction port 72a. In this way, the brake fluid that flows from the accumulator 33 enters the joint 72 from the suction port 72a via the annular channel 56 and the filter 70.

The discharge chamber 54 is connected to the pressure suppression element 111 of the pressure change suppressor 110 through a connection pipe 58. A description will hereinafter be made on an example of the pressure change suppressor that reduces the pulsation of the brake fluid.

The pressure change suppressor 110 has a suppressor housing 112 that is in a pipe shape and has an opening end and a closed end. A tubular pressure suppression element 113 is arranged in the suppressor housing 112, the pressure suppression element 113 also has an opening end and a closed end, and the closed end thereof is arranged in the closed end of the suppressor housing 112.

The opening end of the pressure suppression element 113 is fixed in the opening end of the suppressor housing 112 by using a ring-shaped mount member 114.

The pressure suppression element 113 is formed of an elastomer, and the elastomer may be foamed. The pressure suppression element 113 can be elastically deformable, and at the time, a wall thickness thereof can also be changed by elasticity. Gas such as air seals between the pressure suppression element 113 and the suppressor housing 112. In addition, an inner surface of the pressure suppression element 113 communicates with the discharge chamber 54 of the pump 60 through the connection pipe 58.

The pressure suppression element 113 exerts a deformation suppression effect on the basis of a material characteristic of the elastomer as the material thereof, and the brake fluid that enters the pressure suppression element 113 can suppress a change in the pressure of the brake fluid due to energy consumption at the time of the elastic deformation of the pressure suppression element 113.

<Configuration and Operation of Pulsation Reducer 100>

A description will be made on operation of the pulsation reducer with reference to a hydraulic circuit view including the pulsation reducer 100 and peripheral members thereof illustrated in FIG. 3.

The pulsation reducer 100 is configured to include the pressure change suppressor 110, the throttle valve 120, and the check valve 130.

The throttle valve 120 is a valve that can change the flow rate according to a magnitude of the pressure of the brake fluid that flows out of the pressure change suppressor 110. For example, in the case where the pressure of the brake fluid that flows out of the pressure change suppressor 110 is lower than a specified pressure, the brake fluid flows into the check valve 130 through a throttle channel 120a. Meanwhile, when the pressure of the brake fluid that flows out of the pressure change suppressor 110 becomes equal to or higher than the specified pressure, a valve in the throttle valve 120 is opened, and the brake fluid flows from the throttle channel 120a and also from a valve channel 120b.

Setting of this specified pressure can be adjusted by appropriately changing size of a throttle opening or a spring force of the valve.

Just as described, until reaching the specified pressure, the brake fluid is stored in the pressure change suppressor 110. As a result of storage of the brake fluid in the pressure change suppressor 110, when the brake fluid to flow out of the pressure change suppressor 110 reaches the specified pressure, the valve in the throttle valve 120 is opened.

The brake fluid that flows out of the throttle valve 120 flows through the check valve 130 and then reaches the primary channel 13. Thereafter, in the case where the first switching valve 35 is closed and the inlet valve 31 is opened, the brake fluid flows into the wheel cylinder 12. Meanwhile, in the case where the first switching valve 35 is opened and the inlet valve 31 is closed, the brake fluid recirculates to the master cylinder 11.

Here, in the case where the hydraulic pressure in the master cylinder 11 or the wheel cylinder 12 becomes high and at least one of the first switching valve 35 and the inlet valve 31 is opened, the check valve 130 plays a role of inhibiting the reverse flow of the brake fluid from the primary channel 13. However, in the case where loss of the hydraulic pressure in each of the master cylinder and the wheel cylinder, which is caused by the reverse flow of the brake fluid, is permitted due to a requested specification of the vehicle, the check valve 130 can be omitted.

In addition, as illustrated in this example, since the pressure change suppressor 110 and the throttle valve 120 are separate components, the pressure change suppressor 110 can have a relatively large volume. Thus, it is possible to further improve a pulsation reduction effect by the pressure change suppressor 110.

<Configuration and Operation of Throttle Valve>

FIG. 4 is a cross-sectional view of the throttle valve 120 according to the embodiment of the present invention.

FIG. 5 includes perspective views, each of which illustrates components of the throttle valve 120 in detail.

The throttle valve 120 has: a first housing 121 in a hollow cylindrical shape; a first valve body 122 that is axially movable in the first housing 121; a first spring member 124 that urges the first valve body 122 in a direction toward a first through-hole 121b provided to an end surface of the first housing 121; and a cover 123 that forms a channel for the brake fluid while closing an opening of the first housing 121.

One end of the first housing 121 is opened, and the other end has an end surface 121a that is provided with the first through-hole 121b. The first through-hole 121b is formed such that a hole diameter thereof is gradually reduced toward an inner side of the end surface 121a from an outer side thereof. An annular step section 121c is formed to an outer circumference of the end surface 121a. A slide groove 121e that is parallel with the axial direction is formed to an inner wall of a side surface 121d of the first housing 121.

The slide groove 121e extends from the opening of the first housing 121 to a portion immediately below the end surface 121a. In this example, the three slide grooves 121e are arranged at equally-spaced intervals along an inner circumference of the side surface 121d.

The first valve body 122 has: a hollow sleeve 122a; a first seal section 122b that closes the first through-hole 121b from an inner side of the first housing 121; a support section 122c that is formed from the first seal section 122b to one end of the sleeve 122a and supports the first seal section 122b; and a guide 122d that is formed to an outer wall of the sleeve 122a.

The first seal section 122b is formed in a dome shape and is provided with a throttle hole 122ba to a top portion thereof. The throttle hole 122ba is opened to the top portion of the first seal section 122b, and a hole diameter thereof is gradually reduced inward. Then, while the constant hole diameter is maintained from an intermediate portion, the throttle hole 122ba penetrates a seal member (see FIG. 4). In this example, the support section 122c is formed in a fan shape, and the three support sections 122c are arranged at equally spaced intervals along a circumference of an end portion of the sleeve 122a. A clearance that leads to the inside of the sleeve 122a is provided between two each of the support sections 122c.

The guide 122d bulges from the outer wall of the sleeve 122a while a height and a width thereof remain constant. In addition, the guide 122d extends in parallel with an axis of the first valve body 122 from an end on the opening side of the sleeve 122a to a portion immediately above the other end of the sleeve 122a. In this example, the three guides 122d are arranged at equally spaced intervals along the circumference of the sleeve 122a. The guide 122d is formed such that the width and the height thereof are slightly less than a width and a height of the slide groove 121e so as for the guide 122d to be fitted to the slide groove 121e of the first housing 121.

The sleeve 122a, the first seal section 122b, the support sections 122c, and the guides 122d of the first valve body 122 are formed integrally by resin molding or the like.

The cover 123 has: a circular bottom section 123a; and a side section 123b that is provided perpendicularly from the bottom section 123a.

The bottom section 123a is formed with a spring support section 123aa that supports the first spring member 124, and is also formed with a channel 123ab, through which the brake fluid flows, therearound. The side section 123b is provided with an opening 123ba, from which the brake fluid flows into the secondary channel 14.

Next, a description will be made on the operation of the throttle valve.

When the active pressure build-up control operation is initiated, the brake fluid that is pumped out of the pump 60 is stored in the pressure change suppressor 110 and thereafter reaches the first through-hole 121b of the first housing 121 via the connection pipe 58. In the case where a force (F1s) that lifts the first valve body 122 by the first spring member 124 is larger than a force (F1p) that presses down the first valve body 122 by the hydraulic pressure of the brake fluid that is applied to the first seal section 122b, the first seal section 122b remains in a state of closing the first through-hole 121b. Accordingly, the brake fluid flows into the first valve body 122 only through the throttle hole 122ba. When the amount of the brake fluid that is stored in the pressure change suppressor 110 is increased and the force F1p becomes larger than the force F1s, the first valve body 122 is pressed downward. As a result, the first seal section 122b separates from the first through-hole 121b. Thus, the brake fluid that has reached the first through-hole 121b flows into the first valve body 122 through the clearance between two each of the support sections 122c.

Thereafter, the brake fluid flows through the channel 123ab of the cover 123 and flows out of the opening 123ba to the primary channel 13.

Since the first seal section 122b of the first valve body 122 opens/closes the first through-hole 121b, just as described, the flow rate of the brake fluid can be controlled according to the hydraulic pressure of the brake fluid that flows into the throttle valve 120. In addition, when the first valve body 122 is pressed downward, the guides 122d move along the slide grooves 121e. Thus, axial movement of the first valve body 122 can be stabilized.

<Configuration and Operation of Throttle Valve and Check Valve>

A description will hereinafter be made on a throttle valve 120 and a check valve 130 in a pulsation reducer 100 according to a second embodiment of the present invention with reference to FIG. 6.

A description on the same configuration as that of the throttle valve according to the first embodiment will not be made or will be simplified.

The check valve 130 has: a second housing 131 in a hollow cylindrical shape; a second valve body 132 that is axially movable in the second housing 131; a second spring member 134 that urges the second valve body 132 in a direction toward a second through-hole 131*b* provided to an end surface 131*a* of the second housing 131; and a cover 133 that forms a channel for the brake fluid while closing an opening of the second housing 131.

One end of the second housing 131 is opened, and the other end has the end surface 131*a* that is provided with second through-hole 131*b*. The second through-hole 131*b* is formed such that a hole diameter thereof is gradually reduced toward an inner side of the end surface 131*a* from an outer side thereof. An annular step section 131*c* is formed to an outer circumference of the end surface 131*a*. A slide groove 131*e* that is parallel with the axial direction is formed to an inner wall of a side surface 131*d* of the second housing 131. The slide groove 131*e* extends from the opening of the second housing 131 to a portion immediately below the end surface 131*a*. Similar to the slide groove 121*e* of the throttle valve 120, the three slide grooves 131*e* are provided, and those slide grooves 131*e* are arranged at equally-spaced intervals along an inner circumference of the side surface 131*d*.

The second valve body 132 has: a hollow sleeve 132*a*; a second seal section 132*b* that closes the second through-hole 131*b* from an inner side of the second housing 131; a support section 132*c* that is formed from the second seal section 132*b* to one end of the sleeve 132*a* and supports the second seal section 132*b*; and a guide 132*d* that is formed to an outer wall of the sleeve 132*a*.

The second seal section 132*b* is formed in a dome shape. Unlike the first seal section 122*b* of the first valve body 122, the second seal section 132*b* is not provided with a hole like the throttle hole 122*ba* or the like.

The support section 132*c* is formed in a fan shape, and the three support sections 132*c* are arranged at equally spaced intervals in a circumferential direction of an end portion of the sleeve 132*a*. A clearance that leads to the inside of the sleeve 132*a* is provided between two each of the support sections 132*c*.

The guide 132*d* bulges from the outer wall of the sleeve 132*a* and extends in parallel with an axis of the second valve body 132 from an opening side of the sleeve 132*a* to the seal section 132*b* side. In this example, the three guides 132*d* are arranged at equally spaced intervals along the circumference of the sleeve 132*a*.

The cover 133 has: a circular bottom section; and a side section that is provided perpendicularly from the bottom section. The bottom section is formed with a spring support section that supports the second spring member 134, and is also formed with a channel, through which the brake fluid flows, therearound. The side section is provided with an opening, from which the brake fluid flows into the secondary channel 14.

A description will be made on an assembled state of the throttle valve 120, the check valve 130, and the cover 133 with reference to FIG. 6*b*.

The check valve 130 and the throttle valve 120 are assembled to each other when the opening of the throttle valve 120 is fitted to the step section 131*c* that is formed to the second housing 131 of the check valve 130. At this time, an end of the first spring member 124 of the throttle valve 120 is mounted to the end surface 131*a* of the second housing 131. As a result, the first valve body 122 is lifted by an urging force of the first spring member 124. Thus, the opening of the first valve body 122 is slightly separated from the end surface 131*a* of the second housing 131. In addition, in order to prevent leakage of the fluid from a portion between the first housing 121 and the second housing 131, the first housing 121 and the second housing 131 may be fitted to each other after an O-ring (not illustrated) or the like is assembled to a step section of the second housing 131.

The check valve 130 and the cover 133 are assembled to each other by fitting the opening of the second housing 131 to the side section of the cover 133. Since an end of the second spring member 134 is mounted to the spring support section of the cover 133 and the second valve body 132 is lifted by an urging force of the second spring member 134, the second valve body 132 is slightly separated from the spring support section.

A description will hereinafter be made on operation of the throttle valve and the check valve in the pulsation reducer according to the second embodiment.

The brake fluid that has flowed from the inside of the throttle valve 120 to the opening reaches the second seal section 132*b* through the second through-hole 131*b* of the check valve 130. When a force (F2p) that presses down the second valve body 132 becomes larger than a force (F2s) that lifts the second valve body 132 by the second spring member 134 due to the hydraulic pressure that is applied to the second seal section 132*b*, the second valve body 132 moves downward.

At this time, the brake fluid flows into the second valve body 132 through the clearance between two each of the support sections 132*c*. Here, a spring constant of the first spring member 124 in the throttle valve 120 is larger than a spring constant of the second spring member 134 in the check valve 130. Thus, the second valve body 132 is pressed downward by the lower hydraulic pressure than the hydraulic pressure that is required to move the first valve body 122 downward.

Thereafter, the brake fluid flows through the channel of the cover 133 and flows out of the opening of the cover 133.

Even in the case where the hydraulic pressure in the primary channel 13 is high and the brake fluid flows reversely into the second valve body 132, the brake fluid does not flow reversely into the throttle valve 120 due to a fact that the second seal section 132*b* closes the second through-hole 131*b*.

In addition, the first housing 121 and the second housing 131 are formed to have the same dimensions and the same shape and are formed of the same material, and the first valve body 122 and the second valve body 132 are formed to have the same dimensions and the same shape and are formed of the same material. Thus, it is possible to cut manufacturing cost.

REFERENCE SIGNS LIST

1: Brake system
2: Hydraulic circuit
11: Master cylinder
12: Wheel cylinder
13: Primary channel
14: Secondary channel
15: Supply channel
35: First switching valve
36: Second switching valve
40: Motor
54: Discharge chamber

60: Pump
100: Pulsation reducer
110: Pressure change suppressor
120: Throttle valve
120*a*: Throttle channel
120*b*: Valve channel
121: First housing
121*a*: End surface
121*c*: Step section
121*d*: Side surface
121*e*: Slide groove
122: First valve body
122*a*: Sleeve
122*b*: First seal section
122*ba*: Throttle hole
122*c*: Support section
122*d*: Guide
123: Cover
123*a*: Bottom section
123*aa*: Spring support section
123*ab*: Channel
123*b*: Side section
123*ba*: Opening
124: First spring member
130: Check valve
131: Second housing
131*a*: End surface
131*b*: Second through-hole
131*c*: Step section
131*d*: Side surface
131*e*: Slide groove
132: Second valve body
132*a*: Sleeve
132*b*: Second seal section
132*c*: Support section
132*d*: Guide
133: Cover
134: Second spring member
140: Discharge channel
142: Suction channel

The invention claimed is:

1. A hydraulic pressure control unit comprising:
a discharge channel (140) from which a brake fluid is discharged, a pressure of the brake fluid being increased by a pump (60); and
a pulsation reducer (100) that is provided to an intermediate portion of the discharge channel (140), wherein the pulsation reducer (100) includes:
  a pressure change suppressor (110), a volume of which varies according to a pressure of inflow brake fluid;
  a check valve (130); and
  a throttle valve (120) that is arranged on a downstream side of the pressure change suppressor (110) and an upstream side of the check valve (130) in the discharge channel (140),
the throttle valve (120) includes:
  a first housing (121) that has an end surface (121*a*), one end of which is opened and the other end of which is provided with a first through-hole (121*b*), the brake fluid flowing into the first through-hole (121*b*);
  a first valve body (122) that can move in an axial direction of the first housing (121) in the first housing (121); and
  a first spring member (124) that urges the first valve body (122) in a direction toward the first through-hole (121*b*) of the first housing (121), and the first valve body (122) includes a seal section (122*b*) that closes the first through-hole (121*b*) of the first housing (121) and is formed with a throttle hole (122*ba*), wherein the first valve body (122) has: a hollow sleeve (122*a*); and a support section (122*c*) that is provided to one end of the sleeve (122*a*) and supports the seal section (122*b*), wherein a shape of the seal section (122*b*) is different from a shape of the support section (122*c*);
wherein the check valve (130) has a second housing (131) that has an end surface, one end of which is opened and the other end of which is provided with a second through-hole (131*b*), the brake fluid flowing into the second through-hole (131*b*), wherein an outer surface of the other end of the second housing (131) supports the first spring member (124).

2. The hydraulic pressure control unit according to claim 1, wherein
the first valve body (122) has a guide (122*d*) that guides movement of the sleeve (122*a*) in the axial direction, and
a slide groove (121*e*), with which the guide (122*d*) is engaged, is provided to an inner wall of the first housing (121), the inner wall opposing the sleeve (122*a*).

3. The hydraulic pressure control unit according to claim 1, wherein
the check valve (130) has:
  a second valve body (132) that can move in an axial direction of the second housing (131) in the second housing (131); and
  a second spring member (134) that urges the second valve body (132) in a direction toward the second through-hole (131*b*) of the second housing (131), and
the second valve body (132) includes a second seal section (132*b*) that closes the second through-hole (131*b*) of the second housing (131).

4. The hydraulic pressure control unit according to claim 3, wherein
a spring constant of the first spring member (124) is larger than a spring constant of the second spring member (134).

5. The hydraulic pressure control unit according to claim 2, wherein
the check valve (130) has:
  a second valve body (132) that can move in an axial direction of the second housing (131) in the second housing (131); and
  a second spring member (134) that urges the second valve body (132) in a direction toward the second through-hole (131*b*) of the second housing (131), and
the second valve body (132) includes a second seal section (132*b*) that closes the second through-hole (131*b*) of the second housing (131).

6. The hydraulic pressure control unit according to claim 5, wherein
a spring constant of the first spring member (124) is larger than a spring constant of the second spring member (134).

7. The hydraulic pressure control unit according to claim 1, wherein the shape of the seal section (122*b*) is dome-shaped.

8. The hydraulic pressure control unit according to claim 1, wherein the pressure change suppressor (110) includes a third housing (112), and wherein the throttle valve (120) and the pressure change suppressor (110) are separate components housed in different housings.

9. The hydraulic pressure control unit according to claim 1, wherein the support section (122*c*) has a plurality of support members arranged at spaced intervals along a circumference of the one end portion of the sleeve (122*a*).

10. The hydraulic pressure control unit according to claim 1, wherein the pulsation reducer (100) includes a gasket arranged between the first housing (121) and the second housing (131).

11. The hydraulic pressure control unit according to claim 1, wherein the other end of the second housing (131) includes an annular step section (131*c*) formed to an outer circumference of the outer surface, the annular step section (131*c*) mounting, via an opening of the opened end of the first housing (121), the second housing (131) to the first housing (121).

12. A hydraulic pressure control unit comprising:

a discharge channel (140) from which a brake fluid is discharged, a pressure of the brake fluid being increased by a pump (60); and a pulsation reducer (100) that is provided to an intermediate portion of the discharge channel (140), wherein the pulsation reducer (100) includes:

a pressure change suppressor (110), a volume of which varies according to a pressure of inflow brake fluid;

a check valve (130); and a throttle valve (120) that is arranged on a downstream side of the pressure change suppressor (110) and an upstream side of the check valve (130) in the discharge channel (140), the throttle valve (120) includes:

a first housing (121) that has an end surface (121*a*), one end of which is opened and the other end of which is provided with a first through-hole (121*b*), the brake fluid flowing into the first through-hole (121*b*);

a first valve body (122) that can move in an axial direction of the first housing (121) in the first housing (121); and a first spring member (124) that urges the first valve body (122) in a direction toward the first through-hole (121*b*) of the first housing (121), and the first valve body (122) includes a seal (122*b*) that closes the first through-hole (121*b*) of the first housing (121) and is formed with a throttle hole (122*ba*), wherein the first valve body (122) has: a hollow sleeve (122*a*); and a support (122*c*) that is provided to one end of the sleeve (122*a*) and supports the seal (122*b*), wherein the check valve (130) has a second housing (131) that has an end surface, one end of which is opened and the other end of which is provided with a second through-hole (131*b*), the brake fluid flowing into the second through-hole (131*b*), wherein an outer surface of the other end of the second housing (131) supports the first spring member (124).

13. The hydraulic pressure control unit according to claim 12, wherein the support (122*c*) has a plurality of support members arranged at spaced intervals along a circumference of the one end portion of the sleeve (122*a*).

* * * * *